(12) United States Patent
Bergem et al.

(10) Patent No.: US 9,718,653 B2
(45) Date of Patent: Aug. 1, 2017

(54) MULTI FUNCTION HEAVE COMPENSATOR

(71) Applicant: Ernst-B. Johansen AS, Stathelle (NO)

(72) Inventors: Oddbjørn Bergem, Sandefjord (NO); Stian Sannes, Drangedal (NO)

(73) Assignee: Ernst-B. Johansen AS, Stathelle (NO)

( * ) Notice: Subject to any disclaimer, the term of this patent is extended or adjusted under 35 U.S.C. 154(b) by 42 days.

(21) Appl. No.: 14/821,379

(22) Filed: Aug. 7, 2015

(65) Prior Publication Data

US 2016/0039643 A1   Feb. 11, 2016

(30) Foreign Application Priority Data

Aug. 8, 2014   (EP) .................................... 14180370

(51) Int. Cl.
*B66C 23/53*      (2006.01)
*B66D 1/52*       (2006.01)
(Continued)

(52) U.S. Cl.
CPC .............. *B66C 23/53* (2013.01); *B63B 27/30* (2013.01); *B65G 67/60* (2013.01); *B66D 1/52* (2013.01); *F16F 9/065* (2013.01)

(58) Field of Classification Search
CPC ........ E21B 33/10; E21B 19/006; B66C 23/53
See application file for complete search history.

(56) References Cited

U.S. PATENT DOCUMENTS 3,163,005 A * 12/1964 Reed, II .................. E21B 19/09
60/415

3,687,205 A * 8/1972 Mori ....................... E21B 19/09
175/27

(Continued)

FOREIGN PATENT DOCUMENTS

GB          2503063 A       12/2013

OTHER PUBLICATIONS

Extended European Search Report issued in European Application No. 14180370.0, mailed on Feb. 18, 2015 (6 pages).

*Primary Examiner* — Matthew R Buck
*Assistant Examiner* — Aaron Lembo
(74) *Attorney, Agent, or Firm* — Osha Liang LLP

(57) ABSTRACT

A heave compensator with adjustable dampening properties includes a length extension device having an inner space divided by a slide-able piston into a vacuum chamber and a liquid filled chamber, a gas accumulator divided by a slide-able piston into a gas filled chamber and a liquid filled chamber, and a gas tank having an expansion chamber. The liquid and gas chamber are fluidly connected to each other with valve controlled conduits. Further, the device includes pressure and temperature sensors that register pressure and temperature in the gas and liquid phases. The device further includes a control unit having a signal receiving unit, a writeable computer memory, a data processing unit, and a signal transmitting unit. The data processing unit contains computer software that calculates suited amounts of gas and gas pressure in the gas accumulator and/or gas tank based on the information of which lifting operation is going to be performed. The data processing unit further engages activation means such that the suited amount of gas and gas pressure are achieved and maintained during the different phases of the lifting operation.

20 Claims, 3 Drawing Sheets

(51) Int. Cl.
   *F16F 9/06*      (2006.01)
   *B63B 27/30*     (2006.01)
   *B65G 67/60*     (2006.01)

(56) References Cited

U.S. PATENT DOCUMENTS

| | | | |
|---|---|---|---|
| 3,785,445 A | | 1/1974 | Scozzafava |
| 3,793,835 A | | 2/1974 | Larralde |
| 3,842,603 A | | 10/1974 | Ditzen |
| 3,912,227 A | * | 10/1975 | Meeker ............... E21B 19/09 175/5 |
| 5,522,221 A | * | 6/1996 | Kadlicko ........... B60G 17/0152 60/413 |
| 5,956,951 A | * | 9/1999 | O'Callaghan .......... B60G 17/08 188/267.1 |
| 6,131,709 A | * | 10/2000 | Jolly ..................... F16F 9/20 137/909 |
| 2008/0251980 A1 | | 10/2008 | Ormond |
| 2011/0180160 A1 | * | 7/2011 | Froehlich ............... F15B 1/022 137/455 |
| 2015/0362039 A1 | * | 12/2015 | Cannell ................ E21B 19/002 188/267.2 |
| 2016/0002012 A1 | * | 1/2016 | Cannell ................... B66D 1/52 188/269 |

* cited by examiner

MULTI FUNCTION HEAVE COMPENSATOR

FIELD OF TECHNOLOGY

The present invention relates to a multifunction heave compensator with adjustable dampening properties for heavy lifting operations.

BACKGROUND

Offshore installations, such as offshore windmills, various process modules for subsea oil and gas exploration etc., are in many cases deployed by being transported on seagoing transport vessels out to the placement location, and thereafter lifted off the transport vessel by an on-board crane or crane located on another vessel and lowered into the sea, either to be located on the surface as a floating installation or lowered into the water to be installed on the sea floor.

The deployment, more precise, the lifting operation is sensitive to the weather conditions since, during suspended loads offshore, sea induced movements of the vessel will quickly become problematic since the movements of the vessel and thereby the crane results in variations in the available lifting height between the sea surface and the crane's point of suspension, and because the cyclic wave movements results in periodic accelerated movements of the suspended load.

This is particularly problematic for lifting of heavy cargoes and/or huge constructions, since the accelerated movements of the suspended load induces huge tension forces/strains on the crane and suspension points in the load and danger of re-contact between the load and the transport vessel which may damage the suspended load. After the load has obtained contact with the sea-water, the waves will become problematic since the sea-water viscosity and own weight retains the load/construction with enormous power when the movement of the vessel tries to increase the distance between sea surface and the suspension point of the crane.

Thus, to avoid costly waiting periods where the transport vessel is laying inactive waiting for improved wave conditions allowing such deploying operations, it is a desire for amending these wave induced problems allowing performing the deployment in less favourable weather conditions. The reduction in costs, due to saved waiting times, increases with increased "weather window". It is thus a need for compensating the variation in available lifting height between the point of suspension of the crane and the surface of the sea due to wave induced movements of the lifting vessel to avoid detrimental tension forces on the crane, the suspended load, or re-contact between the vessel and load.

PRIOR ART

It is known that the problems associated with unintended movements of the crane (and the crane vessel) and subsequent powerful variations in the tension forces on the crane during the lift of heavy loads may be alleviated by employing a heave compensator which, in one end is attached to the clevis on the lifting cable of the crane and in the other end to the suspension point of the load. A heave compensator is a mechanism having a spring and/or dampening effect due to being able, when needed, to prolong or shorten the distance between the suspension point of the crane and the suspension point of the load, and thus substantially reduce the variations of the tension forces due to the crane's unintended movements.

From U.S. Pat. No. 3,785,445 it is known a combined heave compensator for the drill string and a riser tensioner for a floating drilling vessel. The heave compensator is schematically shown in FIG. 2 of U.S. Pat. No. 3,785,445, and comprises a heave compensator cylinder 10 with piston rod 18 connected to the end of the drill string DS enabling the piston of the cylinder to absorb relative vertical movements between the drill string DS and the vessel VS (see FIG. 1 of U.S. Pat. No. 3,785,445). The riser DR is connected to a set of stretching cylinders 26 by cables being stretched by piston 28. The stretch is obtained by the part of the inner space of cylinder 26 below piston 28, chamber 12, is pressurised by a liquid by a piston cylinder having a liquid/gas-piston supplying pressurised liquid to chamber 12 via line 40. The pressure is obtained by gas accumulator 52 supplying pressurised gas to chamber 43 in the piston cylinder. The upper chamber in stretching cylinders 26 is also filled with liquid and is fluidly connected to chamber 12 of the heave compensator cylinder 10 via line 30 with an isolation valve 32 and safety valve 34. By interchanging liquid between chamber 12 in the heave compensating cylinder and upper chamber in the stretching cylinders 26, the pistons 18 and 28 in the heave compensating cylinder 10 and the stretching cylinders 26, respectively, obtain a motion pattern where every piston 18, 26 are moved in the same phase. Thus, a simultaneous compensation of the tension forces on the drill string DS and an adjustment of the stretching of the riser DS is obtained in accordance with the vertical movements of the drilling vessel DV due the waves.

From U.S. Pat. No. 3,793,835 it is known a heave compensator for the drill string of floating drill vessels comprising two heave compensating cylinders 13 with piston 14 connected to the drill string, and where piston 14 separates the inner space of cylinders 13 into an upper chamber and a lower liquid filled chamber. The lower liquid filled chamber is fluidly connected to the liquid phase 15 of liquid/gas accumulator 17 via line 18, 20 with cut-off valve 19. The gas phase of liquid/gas accumulator 17 is via line branched line 31 with cut-off valves 32 and 33, fluidly connected to a battery of gas tanks 30, 30a. The pressure of the system is pre-set according to the expected weight on the drill string. By valves 32 and 33, it is possible to vary the number of gas tanks to increase or reduce the available expansion volume to the gas phase, and thus adjusting the dampening characteristics of the heave compensator.

From U.S. Pat. No. 3,842,603 it is known a heave compensator intended for lifting loads by a crane from a floating vessel and lowering the load into the sea, which comprises a heave compensating piston cylinder 12 divided by piston 16 into an upper chamber 19 and a lower chamber 18. Piston 16 is connected to the load via piston rod 17. The lower chamber 18 is filled with liquid and is fluidly connected to the liquid phase of a first liquid/gas accumulator 22 via conduit 21 having a valve 43. Cut-off valve 43 is controlled manually by switch 53 which electrically controls the actuator 44, and may vary between closed and open position. The upper gas filled chamber in the first liquid/gas accumulator 22 is through conduit 24 fluidly connected to a gas supply conduit 28 having an electrically activated cut-off valve 26, and which is connected to a reservoir 31 for pressurised gas, and fluidly connected to gas exit 34 having electrically controlled cut-off valve 32. It is thus possible to increase the gas pressure in the gas filled chamber in the first liquid/gas accumulator 22 by opening valve 26 and maintain valve 32 closed, or the opposite, to reduce the gas pressure by closing valve 26 and opening valve 32, and in this manner, increase or reduce the pressure of the liquid of the liquid phase pressing against the piston 16 in chamber 18. The upper chamber 19 of piston cylinder 12 is also filled with liquid and is fluidly connected to a liquid phase 38 of a second liquid/phase accumulator 37 via conduit 36 having an orifice 41. The upper gas filled chamber in the second accumulator 37 is equipped with two pressure sensitive switches 59 and 62, which are electrically connected to electric actuator 27 of valve 26 and electric actuator 33 of valve 32. Pressure sensitive switch 59 will engage electric actuator 27 if the pressure in the upper gas filled chamber of the second accumulator becomes lower than a pre-set threshold value, and thus, pressurised gas from reservoir 31 begins to flow into accumulator 22, which has the effect of increasing the pressure in the liquid in the chambers 23 and 18 until piston 16 is moved upwards in cylinder 12, and thus reducing the volume of chamber 19 which again presses liquid into the first accumulator 37 causing an increase in the upper gas filled chamber of the first accumulator until the pressure regains the pre-set threshold value. Then the pressure sensitive switch will engage the electric actuator 27 to close the gas inlet 28 of the first accumulator. In this manner, the position of piston 16 is automatically readjusted if the load drags it tom much downwards in the cylinder 12. Pressure sensitive switch 62 will engage the electric actuator 33 if the pressure in the upper gas filled chamber of the second accumulator 37 exceeds a pre-set threshold value (as a consequence of the piston having moved too far up in the cylinder 12) such that the gas exit 34 is opened to lower the pressure in the accumulator 22 and thus allow the load to drag the piston 16 a distance further down in cylinder 12 and the pressure in the upper gas filled chamber of the second accumulator to regain its threshold value. Then switch 62 will engage electric actuator 33 to close the gas exit. In this manner, a heave compensator with automatic correction of the piston position in the heave compensating cylinder is obtained.

When deploying offshore installations and other heavy and/or voluminous objects from a floating vessel, there is a need for a heave compensator which may automatically rectify variations in the loads and change the dampening characteristics in order to maximise the compensating abilities during the different phases of the lifting deployment, and in this manner increase the weather window allowing performing deployment of installations offshore from floating vessels. It is further an advantage that the heave compensator has a simple compact design and a range of compensating abilities allowing optimised compensation during the entire lifting operation from suspended load in air to the placement of installations on the sea bed, and that the heave compensator may function without knowing in advance the exact weight of the load and/or its buoyancy when lowered into the sea.

OBJECTIVE OF THE INVENTION

The objective of the present invention is thus to provide a heave compensating device with automatic regulation of the stroke length which may operate above and submerged in water in environmental pressures ranging from atmospheric pressure to several hundred atmospheres pressure.

It is further an objective to provide a multi-function heave compensating device with a simple and compact construction and which may fully automatically correct the stroke length and change the dampening characteristics above and submerged into water.

DESCRIPTION OF THE INVENTION

The present invention is based on the realisation that heave compensating devices utilising a sliding piston as a volume expanding mechanism to reduce the tension forces upon relative movements between crane and load, may obtain a simple compact construction able to execute a range of different compensation functionalities by registering the pressure and temperature in the gas filled chambers of the device, and employing this information to regulate the amount of gas in the single gas filled chambers. It is further based on the realisation that the range of compensating functionalities may be increased further by changing the accessible volume of the gas filled chambers during operation.

In a first aspect, the present invention relates to a device for compensating for heave movements between a lifting device and a load lifted by the lifting device, characterised in that the device comprises:
  an elongated length extension device (1) comprising:
    a closed upper end (2),
    a lower end (3) having an opening for a piston rod and a liquid outlet (13),
    an inner space divided by a slide-ably first piston (9) into an upper vacuum chamber (3) and a lower first liquid filled chamber (5),
    a piston rod (8) of length at least equal to the length of the length extension device, and which in one end is attached to the first piston, and where the piston rod stretches through the first liquid filled chamber and further out through the opening in the lower end (3) of the length extension device,
    means (10) arranged at the second end of the piston rod for releasable attachment of a load (11), and
    means (6) arranged at the upper end (2) of the length extension device for releasable attachment of a lifting device (7),
  an elongated cylindrical gas accumulator (16) comprising:
    an upper end having a, with a valve (24), adjustable gas outlet (23),
    a lower end having a liquid outlet (14), transfer device (20), and
    an inner space divided by a slide-able piston (21) into an upper chamber (22) and a lower liquid filled second chamber (15),
  a, with a valve (17), adjustable liquid transferring device (20) fluidly connected to liquid outlet (13) and liquid outlet (14),
  activation means (106) for selective opening or closure of one or both of valve (17) and valve (24),
  a first and second measuring means (18, 27) for measuring the temperature and/or pressure of the liquid in at least one of the liquid filled first and second chamber (5, 15) and the gas of the upper chamber (22), respectively, and eventually a third measuring means (19) for measuring the position of the first piston (9), and
  a control unit (110) comprising:
    means for registering the measured temperatures and/or pressures to the liquid in one of or both the first and second liquid filled chamber (5, 15) and the gas in the upper gas filled chamber (22), respectively, and eventually the position of the first piston (9),
    means for calculating the real equilibrium position to the first piston (9) from the registered temperatures and/or pressures, and eventual registered positions of the first piston (9),
    means for calculating the amount of gas which needs to be ventilated out of the first outlet (23) in order to obtain an intended equilibrium position of the first piston (9), and engaging means for engaging the activating means of valve (17) of the liquid transferring device (20) and/or valve (24) of the first gas outlet (23) such the intended amount of gas exits through the first gas outlet and the first piston (9) obtains the intended equilibrium position.

The weight of the load tends to pull the slide-able piston towards the lower end of the length extension device when the load is suspended in the piston rod. As long as the valve on the liquid transferring device is open, a sufficient amount of gas to set up a gas pressure in the upper chamber of the gas accumulator which is at least equal to the pressure of the liquid in the liquid filled second chamber arising from the loads pull on the first piston, is required to counter this movement. This amount of gas may either be stockpiled in advance (before starting the lifting operation) in the upper chamber of the gas accumulator or be introduced into the chamber when necessary from an external source.

The device according to the first aspect of the invention may in one embodiment additionally comprise:
- a gas tank (28) comprising:
  - an upper end having a, with a valve (30), adjustable second gas outlet (25),
  - a closed lower end, and
  - an expansion chamber (29),
- fourth measuring means (31) for measuring the temperature and/or pressure of the gas in the expansion chamber (29),
- a gas transferring device (26) fluidly connected to the first (23) and the second (25) gas outlet,
- a, with a valve (33), adjustable third gas outlet (32) to the environment fluidly connected to the gas transferring device, and
- activation means (106) for selective opening or closure of one or both of valve (30) and valve (32),
- the means of the control unit (110) for registering the measured temperatures and/or pressure, and eventually the position of the piston in the length extension device, are a signal receiver unit (101) receiving the signals from the first, second, and fourth measuring means (18, 27, 31) and eventually the third measuring means (19) and a data storage memory (102),
- the means of the control unit (110) for calculating the equilibrium position of the first piston (9) comprises a data processing unit (104) containing computer software with instructions when executed calculates the amount of gas present in the upper gas filled chamber (22) and/or the expansion chamber (29) by use of a gas equation of state and the registered temperatures and pressures,
- the engaging means of the control unit (110) for engaging the activation means (106) comprises a signal transmission unit (105) for transmission of guidance signals to the activation means (106) of one or more of the first, second, third, or fourth valve (17, 24, 25, 33), and where
- the data processing unit (104) of the control unit (110) contains one or more computer software modules each having a set of instructions which will calculate, according to a wanted compensation functionality, a wanted amount of gas in the upper gas filled chamber (22) and/or the expansion chamber (29), and which thereafter activates the engaging means of the control unit such that the wanted amount of gas in the upper gas filled chamber (22) and/or the expansion chamber (29) is obtained.

In an advantageous example embodiment, the length extension device according to the first aspect of the invention, is an elongated cylinder having an elongated inner space where the slide-able first piston (9) is located in the inner elongated space of the cylinder,
- the means for attachment of the length extension device to the lifting device comprises a hook (6) located on the outside of the first end of the cylinder, and where the cylinder comprises:
- a piston rod (8) arranged in parallel with the centre axis of the cylinder, and which:
  - in one end is mechanically attached to the slide-able first piston,
  - stretches from the first slide-able piston, out through the opening in the other of the cylinder, and further a distance, and which
  - at the other end has attachment means (10) for releasable attachment of a load (11), and
- where the opening in the other opposite end is adapted to form a fluid tight closure around the piston rod.

The measuring means (18, 27, 31) for measuring the temperature and/or pressure of the liquid in at least one of the liquid filled first and second chamber (5, 15), the gas in the upper chamber (22), and the gas in the expansion chamber (2), respectively, may advantageously be a pressure and temperature sensor.

The gas accumulator may also, in an example embodiment, have the design of an elongated cylinder having an elongated inner space in which the second slide-able piston is located, that is, the gas accumulator is an elongated cylinder (16) with an elongated inner space containing and being divided by the slide-able piston (21) into the upper chamber (22) and the liquid filled lower chamber (15).

The device for compensating for heave movements may advantageously also comprises a position sensor which registers the position of the first slide-able piston inside the inner space. The term "position sensor" is in this context, to be understood as any mean able to determine the position of one or both pistons of the device, and feeding this information as an electric readable signal to the control unit (110) of the device for determination of the position of the first slide-able piston in the length extension device. The position sensor may be located on any suited location in the device, included but not restricted to, in the first slide-able piston. A position sensor is advantageous, but not absolutely required; the device may in almost all cases calculate the position of the slide-able piston by determining the amount of gas in the gas accumulator from the information of the pressure and temperature of the gas.

The term "pressure and temperature sensor" is in this context, any sensor able to produce an electric signal representative of the pressure and/or temperature in the pressure and temperature range which may arise in the different chambers of heave compensators and their environments, and which may transfer this information via electric transfer means to a signal receiving unit for further treatment. The sensor may be a combined pressure and temperature sensor, or alternatively a separate pressure sensor and a separate temperature sensor. The invention is not tied to use of any specific sensor, but may apply any known sensor able to measure the actual pressures and/or temperatures. Examples of suited sensors includes, bur are not restricted to; PTX 300 Series from GE, PTX 400 Series from GE, HYDAC ETS Series, HYDAC HDA Series, etc.

The term "adjustable with a valve" is in this context to be understood as any conduit for gas or liquid which may be closed or opened for through-flow by a valve. The term "valve" is in this context any valve able to cut-off and opening a conduit from zero to full through-flow of fluid in the conduit. The valve may be a cut-off valve, i.e. a valve which either is open or closed, a throttle valve which may continuously regulate the cross-section of the conduit for fluid from zero to 100% opening, or any other type of valve. Due to the large pressure differences that may arise in heave compensators, it may be advantageously be employed a by-pass conduit with a pressure equalising valve across each valve in the heave compensator (i.e. valves 17, 24, 30, and 32) to be able to equalise the pressure difference gradually in a controlled manner, and thereafter opening the one or more of the respective valves 17, 24, 30, and 32 for full through-flow.

An example embodiment of a heave compensating device according to the first aspect of the invention which utilises a cylinder having a slide-able piston as length extension device and a gas accumulator, eventually a gas tank, is schematically illustrated in FIGS. 1 and 2. These example embodiments are not to be interpreted as a limitation of the scope of the invention. It is envisioned other example embodiments which utilises more than one cylinder 1 and gas accumulator 16, and eventually gas tank 28.

The extension device shown in FIG. 1 comprises a cylinder 1 having a first end 2 and an opposite second end 3. The inner space of the cylinder 1 is divided into a vacuum chamber 4 and a liquid filled chamber 5. The liquid may advantageously be glycol based liquids such as i.e. the liquid sold under the trade mark Houghto Safe 105 or 273 CTF; however, the present invention may apply any non-compressible liquid with sufficient low freezing point and correspondingly high boiling point to avoid phase transformations at the pressures and temperatures that may arise in heave compensators.

The cylinder 1 according to this example embodiment, is at a first end equipped with a hook 6 for attachment to the lifting cable of the lifting device 7 (the lifting device is not shown). In the other end 3 of cylinder 1, a piston rod 8 is protruding out of the cylinder. Piston rod 8 is in one end attached to a slide-able piston 9 and has in the other end a hook 10 for releasable attachment of a load 11 by use of a load attaching cable 12 etc. Lifting cable 7, piston rod 8, and load attachment cable 12 are arranged along the centre axis of cylinder 1, such that when the slide-able piston 9 changes position inside the cylinder 1, the vertical length between the suspension point 10 of the load and the suspension point of the lifting device 6 will vary, and thus compensate for heave movements during lifting of the load. The slide-able piston 9 is equipped with a position sensor 19 which continuously or at regular intervals registers the position of the piston inside cylinder 1 and transfers this information to the signal receiving unit (not shown in FIG. 1). A first pressure and temperature sensor 18 is located in the first liquid filled chamber 5 which continuously or at regular intervals register the pressure and/or temperature of the liquid in the liquid filled chamber 5, and transfers the information to the signal receiving unit.

At the other end 3 of cylinder 1 according to this example embodiment, there is a liquid outlet 13 connected by a conduit 20 having a first valve 17 which may be regulated via electric activation means (106) to a liquid outlet 14 of a second liquid filled chamber 15 of a second cylinder 16, in order to regulate the flow cross-section area and thus the flow resistance of the liquid flowing between the first 5 and the second 15 liquid filled chamber. Valve 17 may by the activation means (106) be regulated continuously to any position from 100% closure to full opening of conduit 20.

Cylinder 16 is a gas accumulator where the inner space is fluid tight divided by a slide-able piston 21 into the second fluid filled chamber 15 and a first gas filled chamber 22. The first upper chamber 22 has a first gas outlet 23 equipped with a second valve 24 which may, via electric activation means (106), be regulated to any position from 100% closure to full opening of conduit 23. The first gas outlet 23 is via a gas transferring device 26 which i.e. may be a gas manifold etc., connected to a second gas outlet 25. The second upper chamber 22 has a second pressure and temperature sensor 27 which continuously or at regular intervals registers the pressure and/or temperature of the gas in the chamber and transfers this information to the signal receiving unit.

In the example embodiment shown in FIG. 2 *m* the device also comprises a gas tank 28 comprising an inner expansion chamber 29 with a gas outlet 25. Gas tank 28 may advantageously be cylindrical in order to better enable storing of gas in expansion chamber 29 at high pressures, however, any design of the gas tank 28 able to withstand storing gas at up till 400 bar may be applied in the present invention. The second gas outlet 25 is equipped with a third valve 30 which may be, via electric activation means (106), regulated continuously to any position from 100% closure to full opening of the second gas outlet 25. A third pressure and temperature sensor 31 is located inside expansion chamber 29, and which continuously or at regular intervals, registers the pressure and/or temperature of the gas in the expansion chamber and transfers this information to the signal receiving unit.

The gas transferring device 26 has a third gas outlet 32 leading out to the surroundings of the heave compensator. The third gas outlet 32 is equipped with a fourth valve 33 which may be regulated continuously to any position in order to regulate the amount of gas flowing through the third gas outlet to any position from 100% closure to full opening of the third gas outlet by electric activation means (106). The third gas outlet may be applied for ventilating gas from the gas accumulator 18 and/or the gas tank 28, and it may advantageously include means (not shown) for connecting the outlet to an external gas source for accumulating gas in the gas accumulator 16 and/or the gas tank 28.

The load will exhibit a pulling force which is proportional to the mass of the load on the slide-able piston of the length extension device and which seeks to pull the piston downwards toward the other end. The fluid pressure of the liquid in the first liquid filled chamber 5 needs thus to be adjusted to the pulling force induced by the load to enable the length extension device to function as intended. If the fluid pressure is too low, the load may pull the piston 9 too far against and in the worst case even make it butt against the second end 3, and opposite, if the pressure is too high the piston may be pushed upwards and in the worst case butt against the first end 2 of the length extension device. An optimum functioning of the length extension device relates to an equilibrium position of piston 9 at about the middle of the inner space of the length extension device.

The term "continuous" as used in this context is not to be understood in the mathematical sense of the term as continuously connected without the slightest interruption. Continuous as used in this context means a satisfactorily tightly connected series of measurements made at sufficiently small intervals to form a timely correct and representative picture of the variation of the variable being measured. How close the point measurements/registrations need to be performed to obtain this, depend on how rapidly i.e. the pressure or temperature changes in the gas phases of the heave compensating device. The determination of this is within the ordinary skill of the person skilled in the art.

When lowering a load into water, there may be relatively huge variations in the pulling force from the load (the sensible weight of the load) on the first slide-able piston, due to the buoyancy in water reduced the sensible weight of the load when the load obtains contact with and is being lowered into the water masses, and further when the load is lowered to greater water depths due to the increased static fluid pressure of the deep water masses which induces an increasing pressure that presses against the opening at the second end of the length extension device. The press resulting from the static water pressure seeks to push the means for mechanically attaching the first slide-able piston to the load, which in some example embodiments is the piston rod 8, into the length extension device, and which at great water depths exhibit a considerable pressing force. It is thus a need for being able to regulate the pressure of the liquid in the first liquid filled chamber 5 of the length extension device in accordance with the variations in the sensible weight of the load to prevent that the available stroke of the piston becomes too small as a consequence of the equilibrium position of the piston is shifted too much towards the first or second end of the length extension device.

Another problem with lift of large installations etc. is that there may be significant discrepancies between the real and calculated mass and/or between real and calculated buoyancy of the installation when lowered into the sea. It is thus advantageous if the heave compensating device may automatically regulate the position of slide-able piston inside the length extension device to maintain a satisfactory stroke length without being dependent upon knowing in advance the approximately correct mass and/or buoyancy of the load. In other words, it is advantageous if the device may automatically correct for changes the sensible weight of the load more or less independent of the size of the variations.

The heave compensating effect of the heave compensating device is associated to the ability of the slide-able piston to move inside the length extension device, which in this example embodiment is a result of a piston cylinder and the complementary pressure forces arising inside the unit and acts on the piston as a consequence of its movement. When the piston is moved downwards in the cylinder of the length extension device, liquid will flow out of the first liquid filled chamber and into the second liquid filled chamber, and thus press the slide-able piston of the gas accumulator upwards such that the volume of the upper chamber of the gas accumulator is reduced. An opposite movement of the piston will result in that liquid flows into the first liquid filled chamber which in the corresponding manner results in that the volume of the upper chamber of the gas accumulator increases.

Due to the compression resistance of the gas, the gas will exhibit a counter-acting force on the slide-able piston when it moves downwards (towards the second end 3) which increases with increasing compression degree/stroke length. At the opposite movement of the piston, when it moves upwards (towards the first end 2), the volume of the gas will decrease such that its counter-force against the piston diminishes with the stroke length of the piston. Together this results in a springy effect on the piston (both in the gas accumulator and in the length extension device) which is proportional to the stroke length from its equilibrium position.

The spring resistance, i.e. the size of the compression resistance of the gas, depends on the compression degree of the gas, which is a function of the available gas volume in the device. The bigger available volume for the gas, the less the compression or the expansion degree becomes at the same stroke length, and thus the softer the spring resistance becomes. One option for increasing the available volume for the gas phase being compressed by the movements of the piston of the gas accumulator is to allow the gas to flow freely into the gas tank. By use of several gas tanks in the same unit, one may regulate the spring resistance in several steps by making one or more gas tanks available for the gas. Alternatively, or in combination with use of several gas tanks, is may be employed two or more gas accumulators which selectively may be engaged to provide the wanted gas expansion volume by opening or closing the liquid supply from the length extension device to the gas accumulator. A gas changing its volume under adiabatic or close to adiabatic conditions will change its temperature and pressure according the gas equation of state.

Alternatively, or in addition to regulating the available gas volume in the device, the spring resistance of the length extension device may be regulated by regulating the flow resistance through the first liquid outlet of the length extension device by varying the opening of the valve on the first liquid outlet. This provides a "dead" change, i.e. an approximately constant change of the spring resistance independent of position of the piston inside the length extension device, and which may be regulated from full through-flow with a low pressure drop over the valve to an effective closure of the first liquid outlet. The opening degree of valve 17 decides the size of the pressure drop of the liquid, and thus the resistance towards moving the slide-able pistons 9, 21. This dampening effect is a function of the degree of constriction of the cross-section of the flow conduit in the valve.

At offshore lifting operations, the heave compensating device will in many cases be subject to cyclic water wave induced stretching forces making the piston to swing more or less cyclic above an equilibrium position inside the length extension device. The term "equilibrium position" as used herein, is the position that the slide-able piston would attain inside the length extension device if the load is freely suspended without any movements and the lifting vessel is laying still without any form of movements that results in heave movements on the lifting device or load.

The heave compensator according to the invention may thus utilise regulation of amount of gas and/or available gas expansion volume to vary the dampening properties and/or the equilibrium position of the slide-able piston by allowing or preventing the gas from flowing between to or more chambers. This form of regulation requires that the heave compensator comprises at least one length extension device, at least one gas accumulator, and at least one gas tank fluidly connected to each other with adjustable valves as shown schematically in FIG. 2, and means for selective engagement of the valves which provides the wanted dampening characteristic and/or regulation of the equilibrium position of the piston. Thus it is the amount of gas in the gas accumulator(s) and/or gas tank(s) of the device, and which portion of these units' volume that are made available for the gas to distribute itself in, that regulates the heave compensating and/or dampening spring effect of the heave compensating device. In addition, there may also be utilised, together with regulation of available gas volume or as a separate mean, regulating the constriction degree of the valve of the first liquid outlet to regulate the dampening effect of the heave compensator.

In other embodiments the heave compensator according to the invention may comprise more than one length extension device, which each has a slide-able piston and which are arranged in parallel side-by-side. The means for mechanically attaching the slide-able piston to the load of each length extension device may advantageously be attached to each other such that the slide-able piston of each length extension device will always have the similar position and such that it is the combined effect of the pistons that provides the heave compensating effect of the device. There is no upper limit on the number of length extension devices that may be applied by a heave compensator according to the invention, but from a practical point of view there will usually be suited with one, eventually two or four length extension devices arranged in parallel side-by-side of each other or in series after each other. In cases where the length extension device is a cylinder with a slide-able piston such as schematically illustrated in FIG. 1 or 2, the connection of the means for mechanically linking the first slide-able piston of each length extension device to the suspended load may be obtained by mechanically connecting the piston rod 8 of the two or more cylinders 1 to each other at the second end (the opposite end of the end attached to the slide-able piston) by i.e. a mechanically bridging construction connected to each piston rod 8. In this case, the attachment means for attaching the load may be arranged the bridging construction.

In the same manner, there is no upper limit on the number of gas accumulators that may be applied in a heave compensator according to the invention. It is envisioned applying any optional number of gas accumulators from at least one and upwards, and where the liquid outlet of each applied gas accumulator has a valve with activation means and which is fluidly connected to the liquid outlet to at least one length extension device of the heave compensator. In practice, the number of gas accumulators being applied is from one to four for each length extension device being applied in the heave compensator.

It may likewise be applied more than one gas tank which is fluidly connected to one or more gas accumulator of the heave compensator. In cases with two or more gas tanks, the regulation of gas to and from the gas tanks may advantageously be obtained by a gas manifold which fluidly connects every gas outlet of the gas tanks and gas accumulator(s) to each other. This provides a very flexible link-up allowing using any combination of one or more gas tanks together with one or more gas accumulators for regulating the amount of active gas in the system and/or available gas expansion volume. In this manner it is obtained a possibility of fluidly connecting from none to every expansion chamber 29 to from none to every upper chamber 22 of the device.

The invention is not delimited to the cylindrical example embodiment of the length extension device and/or the gas accumulator, it is envisioned other constructions of these devices such as inner chambers designed as quadratic parallel-epipeds, rectangular parallel-epipeds, polygonal parallel-epipeds etc.

When the invention is used for deploying loads in deep water, the hydrostatic pressure of the water make it difficult and in many cases impossible, to ventilate gas out of the device when it is lowered into the water masses. In addition, the hydrostatic pressure of the water acts on the piston of the length extension device and reduces the sensible weight of the load as it is lowered to greater water depths, and thus induce a need for regulating the equilibrium position of the piston in accordance with the reduction of the sensible weight of the load. In order to be able to regulate the equilibrium position of the piston in accordance with the reduction of the sensible weight of the load, the device needs to reduce the pressure of the gas phase pressing against the piston of the gas accumulator accordingly. By lowering of loads into deep water, there may be a need for preparing the gas tank or if the unit applies more than one gas tank make at least one gas tank prepared, by lowering the pressure in the gas tank(s) to a lower pressure than the counter-pressure required of the gas phase to regulate the equilibrium position of the piston at deep water before or just after the device being lowered into the water masses and becomes surrounded by water at high hydrostatic pressure.

The device according to the first aspect of the invention may advantageously also include a fifth valve downstream of the fourth valve functioning as a "watch dog" on the third gas outlet (the outlet for discharging gas to the surroundings).

At heavy lifts there may arise relatively huge pressure differences of several tens of bars or more across the first, second, third, fourth and/or fifth valve. Thus, in one example embodiment, the device according to the first aspect of the invention include a by-pass conduit having a pressure compensating valve across one or more of the first, second, third, fourth and/or fifth valve in order to be able to regulate the pressure exchange between the chambers of the device in a gentle and controlled manner before opening the valve of the respective gas or liquid outlet/inlet.

In another embodiment, the device according to the first aspect of the invention may include a fourth pressure and temperature sensor measuring the pressure and temperature of the surroundings of the device (the air or water pressure and temperature), and transfers these measurement data to the signal receiving unit of the device, to enable utilising these data in the estimates over which pressures and amounts of gas in the gas chambers of the device required to obtain the intended heave compensating effect during the lifting operation. This is especially advantageous for being able to effectively compensating for the relatively huge pressure increases in the surroundings during lifting operations where a load is to be deployed in deep water.

In another embodiment, the invention according to the first aspect may advantageously also include a signal emitter and receiver for being able to transfer guidance signals from an operator and/or another external guidance unit to the data processing unit of the control unit (110) of the device, and/or passing information of the state of the device to an external guidance unit and/or operator. The transmission may be wire-less, such as a radio signal, or via a wired connection.

The device according to the first aspect of the invention may include one, two or any combination of the above given alternative embodiments. That is, including a by-pass conduit with a pressure compensating valve over one or more of the first, second, third, fourth, and/or fifth valve, a pressure and temperature sensor measuring the pressure and temperature of the surroundings of the device, and signal receiver and emitter.

The control unit of the device according to the first aspect of the invention may advantageously include a signal treatment unit which filters out cyclic movements such as wave motions in the signal from the position sensor of the length extension device, in order to estimating the equilibrium position of the piston independently of which wave movements or other more or less stochastic movements the piston is being exposed for. The signal treating unit may advantageously include a filter which reduces/removes signal noise in the signals from one or several of the first, second, third, and fourth pressure and temperature sensor. The signal treating unit may apply any known signal filtration technique for this purpose, such as a low-pass filter with subsequent signal calibration and thereafter a Kalman filter for finding the equilibrium position and/or to reduce signal noise. The signal treating unit would usually be located between the signal receiving unit and the data storage memory and between the signal receiving unit and the data processing unit of the control unit (110) for feeding these components with the estimated equilibrium position and/or "cleaned" pressure and temperature data.

Offshore lifting operations may involve a range of different needs for heave compensations to compensate for stretching forces and/or collision risks due to wave induced motions and/or other relative movements between the load and the lifting device. A non-exhaustive list over different lifting phases and accompanying functionalities that a heave compensating device is wanted to exhibit is:

1. Quick lift. The device assists the lifting device in lifting the load at the start up of the lift in order to ensure a safe lifting height above the deck or other physical construction of the cargo vessel to reduce the risk of re-contact due to wave motions etc.
2. Lock and possibly release. When lifting the load over the rail of the cargo vessel, other physical structures etc., it may be advantageous to ensure a minimum safety distance between the vessel/structure and the suspended load. This is obtained by locking the piston of the length extension device in a static position and thereafter releasing the piston when the load is clear of the obstruction. This functionality may also be applied when lowering the load onto a solid ground. This functionality is also functioning as a safety-precaution by enabling locking the piston if a malfunction occurs, such as a gas leakage etc. This function may advantageously be remotely triggered by an operator or another external guidance unit.
3. Weight compensation. This functionality regulates the equilibrium position of the piston of the length extension device to maintain an effective stroke length during the lift by changing the "pre-stress", i.e. the pre-set gas pressure in the gas tank and/or the gas accumulator during different lifting phases by discharging a controlled amount of gas to the atmosphere/surroundings during the lift to achieve the required gas pressure above the piston of the gas accumulator. This functionality is the normal heave compensation effect of the heave compensator, and is suited when the load is suspended in air or being lowered into shallow water masses.
4. Reduction of spring resistance. This functionality ensures to reduce the heave compensators dampening of the piston stroke, and is useful at the final part of lifting operations for providing a softer contact between the load and sea bed when a load is lowered into a water phase and further down to be deployed on the water bed.
5. Depth compensation. When a load is lowered to huge water depths the pressure of its surroundings is substantially changed, and thus the pressing forces on the piston of the length extension device. This may also result in a need for automatically regulating the position of the piston of length extension device. In this case the device cannot ventilate excess gas to the surroundings, and is thus required to utilise its own gas expansion capacity to obtain the required regulation of the equilibrium position of the piston.
6. Landing compensation. When a load is to be lowered onto a firm ground, heave movements may involve a risk for the load being lifted up just again after the first touchdown and thereafter obtains a re-contact with the ground. This risk may be reduced by letting the heave compensator compensate for eventual heave movements such that the lifting device changes its characteristics and provides an approximate constant lifting force towards the load which is less than the weight of the load after the first touchdown.

An example embodiment of a control unit able to provide this flexibility in appliances is schematically shown in FIG. 3. In the figure, the different constituents of the system are shown schematically as boxes. Each box with non-broken line located inside the large box with broken line represents a physical part belonging to the control unit, while the two boxes with non-broken line located outside of the box with broken line represents one or more physical parts located in other areas of the heave compensator in communication with the control unit (110).

The box marked with reference number 100 represents the set of sensors in the heave compensator measuring the pressure, temperature and positions of the piston of the length extension device. These comprises at least one pressure and temperature sensor located in the liquid filled chamber of each length extension device being employed in the heave compensator, at least one pressure and temperature sensor located in the first upper chamber of each gas accumulator being employed in the heave compensator, at least one pressure and temperature sensor located in upper chamber of each gas tank being employed in the heave compensator, and at least one sensor measuring the position of the slide-able piston in at least one of the length extension devices being employed by the heave compensator. In one example embodiment of the invention, the box 100 may additionally comprise at least one or more pressure and temperature sensor(s) measuring the pressure and temperature of the surroundings of the heave compensator. The sensors produce electric signals which are representative for the variable being measured at regular intervals or continuously, and transmit them via electric conducting means as a stream of raw data (depicted schematically with an arrow on the figure) to a analogous signal receiving unit 101.

The signal receiving unit 101 receives the stream of raw data from every sensor of the heave compensator and copies them to make a duplicate stream of raw data, where one of the copied streams is passed on to a computer storage of type computer memory chip/logging module 102 which chronically registers the incoming data stream form each sensor, and where one of the copied streams is passed on to a signal treatment unit 103.

The signal treatment unit 103 processes the incoming raw data stream from each sensor connected to the signal receiving unit 101 of the control unit 110 to reduce the signal noise. The processed raw data from each sensor is then transferred consecutively as a stream of processed data of the pressure and temperature in the respective fluid filled chambers of the heave compensator, the position of the piston of the length extension device, and/or the pressure and temperature of the surroundings of the heave compensator to the logging module 102 where they are logged chronologically. A similar stream of processed data is passed on to a data processing unit 104. This may be accomplished by the signal treatment unit described above, or by any other signal treatment unit capable of performing the same tasks.

In addition, the signal treatment unit will continuously, or alternatively at regular intervals, process the processed data or alternatively the raw data form the position sensor of the length extension device to determine the equilibrium position of the piston at the actual moment. This information will also be passed on to the logging module 102, which registers it chronologically and to the data processing unit 104 which applies the information to determine the need for regulating the equilibrium position of the piston.

The data processing unit 104 receives a stream of processed signals from every sensor which provides real time information of pressures and temperatures in the respective fluid filled chambers of the heave compensator, and eventually of its surroundings, and the equilibrium position of the piston of at least one length extension devices of the heave compensator. The data processing unit will determine, by use of a suited gas equation of state and information of the intended functionality of the heave compensator, determine the size of the gas expansion volume which should be made available and which pressure the gas should have at the actual temperature (i.e. determine the amount of gas inside the available volume) to adjust the dampening characteristics and/or adjust the equilibrium position of the piston of the length extension device. The data processing unit 104 will thereafter sending electric guidance signals to a signal transmission unit 105, which via electric transmission means, is connected to one or more of the activation means 106 on the first, second, third, fourth, and/or fifth valve and eventually to the pressure compensating means across these valves. The signal transmission unit 105 passes the guidance signal from the data processing unit 104 further to the respective activation mean(s) for regulation of the valve. As a consequence, gas will either flow in or out of the outlet of the respective chamber and thus that the pressure, and in some cases also the temperature, in the respective upper chamber(s) is changed.

Alternatively, or in addition, the data processing unit 104 may calculate the need for changing the flow resistance through the first liquid outlet of the length extension device and engage the activation means 106 on the valve of the first liquid outlet and/or pressure compensating valve in order to regulate the flow resistance in the liquid outlet by constricting or expanding the cross-section of the conduit through the valve, or to effectively block the first liquid outlet if desired.

The data processing unit 104 receives, continuously or at regular intervals, information of changes in the pressure and eventually the temperature in the respective upper chamber(s) by way of the incoming stream of processed data from the signal treatment unit 103, and will continuously compare the measured pressure and temperature in the respective upper chamber(s) with the calculated desired pressures and temperatures. Guidance signals will be transmitted accordingly to the respective activation means 106 for either maintaining or ending the regulation of the gas amounts and pressures in the respective gas filled cambers.

The signal transmission unit 105 is, via electric transmission means (shown schematically as an arrow to box 106 in the Figure), connected to every activation mean 106 for engagement of a valve and pressure compensating valve present in the heave compensator. The activation means are schematically illustrated as box 106 in FIG. 3, and comprise at least one activator for the valve on the liquid outlet of each length extension device being employed in the heave compensator, at least one activator for the valve on the gas outlet of the upper chamber of each of the at least one gas accumulator being employed in the heave compensator, at least one activator for the valve on the gas outlet of the upper chamber of each of the at least one gas tank being employed in the heave compensator, and at least one activator for the valve on the third gas outlet (to the surroundings of the heave compensator). In example embodiments involving a by-pass conduit across one or more of the above-mentioned valves, the activation means 106 of these pressure compensating valves are also connected, via electric transmission means, to the signal transmission unit 105.

The heave compensator according to the invention is thus enabled to a fully automatic regulation/change of the dampening characteristics and/or the equilibrium position of the piston of the length extension device without needing other external information than which lifting operation(s) that is(are) to be executed and which of the above-given lifting phases that are involved, i.e. which functionalities the heave compensator should perform at which lifting phase of the lifting operation, insofar the heave compensator is in advance supplied with the required amount of gas to its respective gas tank(s) enabling acquiring the necessary gas pressures in the respective gas filled chambers during all phases of the lifting operation. A great advantage of the heave compensator according to the invention is that it does not need in advance information about the sensible weight of the load, neither when suspended in air or in a lowered condition, but is able to execute the required regulation of the equilibrium position of the piston of the length extension device solely from information entering the control unit 110 from the sensors of the heave compensator and the computer software of the control unit 110.

An automatic and flexible regulation of the stroke length of the piston of the length extension device may for instance be obtained by the data processing unit 104 employing the information of the piston's equilibrium position as determined by the signal processing unit 103 to determine how much the equilibrium position needs to be adjusted in order to obtain an equilibrium position approximately in the middle of the inner space of the length extension device. The data processing unit determines, in accordance with the need for adjustment, the amount of gas that needs to be supplied to or alternatively discharged from the first upper chamber of the at least one gas accumulator to obtain a gas pressure balancing the liquid pressure (arising as a consequence of the sensible weight of the load) when the gas phase in the first upper chamber has a volume which gives the desired equilibrium position of the piston of the length extension device, and sends thereafter the required guidance signals to the valve and/or pressure compensating valve of the gas outlet of the first upper chamber. It may in some cases be necessary to reduce the gas pressure in the connected gas tank in order to be able to obtain the required reduction of the pressure of the gas in the first upper chamber of the gas accumulator. The data processing unit 104 will thus take the pressure of the connected gas tank into account, and eventually engage the activation means 106 of the gas outlet of the gas tank and the third gas outlet for discharging the required amount of gas. For operations where the heave compensator is to be applied for deploying a load in deep water, it is necessary to lower the gas pressure by discharging an amount of gas from the at least one gas tank before the device reaches water depths the hydrostatic pressure of the water makes it impossible to discharge gas.

Advantageously, the data processing unit 104 may contain a set of pre-programmed computer software programs or sub-routines which each contains the required set of instructions for executing one of the desired functionalities listed above; Quick lift, Lock and eventual release, Weight compensation, Reduction of spring resistance, Lowering preparation, Depth compensation, and Landing compensation. In this way, the heave compensator may execute for instance Depth compensation by letting the data processing unit 104 execute the sub-routine containing the set of instructions for performing this functionality. Engagement of the desired sub-routines may be obtained automatically by the data processing unit trigging the execution of the desired sub-routines according to the information entering the data processing unit from the sensors of the heave compensator and from pre-stored information of which lifting operation that is to be executed. For instance, the functionality Quick lift may be triggered when the data processing unit for the first time detects that the weight of the load draw the piston of the length extension device downwards when the weight of the load begins to exert a strain on the heave compensator. The functionality Lowering preparation may be triggered automatically when the pressure and temperature sensor of the heave compensator registers that the heave compensator has reached a contact with water, and when this function is performed, the sub-routine for the functionality Depth compensation may be engaged. This may then be released by the sub-routine for Landing compensation and/or Reduction of spring resistance when the sensor of the surroundings registers that the heave compensator has reached a certain water depth etc.

Alternatively the heave compensator may be equipped with a radio signal receiver 107, or alternatively a wire-based transmitted signal receiver, for receiving external guidance signals which trigger the execution of the different sub-routines in the data processing unit.

One condition for the functioning of the heave compensating device is that it has access to sufficient amounts of gas to form a gaseous phase in the first upper chamber with an adequate pressure and volume to be able to obtain an equilibrium position of the first piston of the length extension device during the entire lifting operation. The required amount of gas for the functioning of the heave compensating device must either be accumulated in the device in advance (before initiating the lift) or be obtained by connecting the device to an external gas supply which supplies the gas on demand. In case of employing an external gas supply, it may i.e. be connected to the third gas outlet located on the gas transferring device, or alternatively, the expansion chamber of the at least one gas tank may be equipped with a gas inlet connected to an external gas source. However, accumulation of gas is usually performed during preparation of the heave compensating device for a lifting operation.

From a practical point of view, it is of great advantage to be able to avoid taking consideration to external connection means for gas supply during the lift. This is especially pertinent for offshore lifts where the load is to be placed on the sea bed. It is thus advantageous to accumulate sufficient gas resources in the heave compensating device in advance of the lifting operation. This may easily be obtained by connecting an external gas supply to the third gas outlet and make use of the valves of the first, second and third gas outlet, respectively, to ensure that the external gas supply pumps the required amount of gas into the expansion tank of at least one of the gas tank(s). The required amount of gas depends on the weight of the load and the volume of the inner space of the length extension device. There is however, an asymmetry in the system since the system is at least able to discharge gas (as long as it is not submerged in deep water) when needed, but depends on access to accumulated gas to increase the pressure of the chamber. It is thus an advantage to over-estimate the need for gas to ensure that sufficient gas resources are accumulated before initiating the lifting operation.

This is also advantageous in that the heave compensating device may assist in obtaining lifting height more rapidly at the beginning of the lift when motion of the sea or other movements of the vessel involves a risk of re-contact between the vessel and the load. A more rapid lifting height may be obtained by lowering the pressure in the first upper chamber such that the gas phase provides none or only a limited resistance towards the second slide-able piston being moved upwards against the first gas outlet when the weight of the load drags the first slide-able piston downwards against the second end of the length extension device, and in this manner ensures that the length extension device acquires a maximum length when the lifting devices initiates the lift. Thereafter the second, third, and fourth valve on the first, second, and third gas outlet, respectively, is regulated such that gas accumulated in at least one expansion chamber of at least one gas tank flows into a first upper chamber of the at least one gas accumulator and forms a gas pressure pressing back both slide-able pistons and thus making the length extension device shorter and thus contributes to lifting the load up from the ground/deck of the vessel etc. This lifting aid functionality may advantageously involve supplying sufficient amount of gas to obtain that the first slide-able piston is pressed up from the second end all the way up to the first end of the length extension device and is maintained in this position until the lift has obtained a safe height avoiding danger of re-contact between the suspended load and the vessel. The period form the beginning up to this point of the lifting operation is in the following denoted as the initial phase of the lift. Thereafter follows the freely suspended phase, which is the period when the load is suspended by the lifting cable of the lifting device in a distance off the vessel and sea/ground.

In the freely suspended phase it is desired that the heave compensating device compensates for the heave movements to reduce the tension forces on the lifting device resulting from these movements. This may be obtained by reducing the gas pressure in the first upper chamber until it reaches a level where the equilibrium position of the piston of the length extension device is regulated to approximately the middle of the inner space of the length extension device as described above.

In the case of offshore lifting operations, the load obtains contact with the sea and will become gradually lowered into the sea water until the load either floats or becomes fully submerged and surrounded by the sea water. This phase of the lifting operation is hereafter denoted as the splashing zone. In this phase the sensible weight of the load reduces gradually with the lowering of the load into the water due to the much higher buoyancy of water as compared to air. Thus there will usually be necessary to further reducing of the pressure in the first upper chamber(s) to maintain an optimal stroke length. The present invention obtains this reduction as described below.

If the load is an installation or other type of load that is to be deployed on the sea bed, the hydrostatic pressure of the water exerts an increasing pressure towards the opening at the second end of the length extension device. This pressure induces a force on the first slide-able piston which needs to be compensated if the optimum stroke length of the length extension device is to be maintained. The hydrostatic pressure of the sea water is also inducing a pressure on the third gas outlet, and reduces thus gradually the ability of the heave compensating device to discharge gas through the gas outlet in order to reduce the pressure in the first upper chamber. Usually, it is necessary to take this into account when the load is to be lowered in deep water where the hydrostatic pressure may be of several atmospheres. A solution to this problem according to the present invention is to let the computer software of the control unit 110 contain instructions which results in, at the end of the splashing phase, that the gas in the expansion chamber of at least one of the at least one gas tanks is emptied as much as required for the gas inside the expansion chamber by discharging the gas until the pressure inside the chamber is lowered to the pressure necessary for being able to regulate the equilibrium position of the piston to the desired position at end phase of the lift (at deep water). This effect may be enhanced by using more than one gas tank being connected to each gas accumulator by a gas manifold as described above.

By installations on the sea bed, it may be advantageous to vary the dampening characteristics of the heave compensating device to a less stiff spring resistance before the installation reaches the sea bed. This may be obtained by increasing the volume of the gas phase exhibiting the resistance on the second slide-able piston, and may easily be obtained by the heave compensating device according to the invention by opening the valve of the first gas outlet and the second gas outlet to connect the at least one first upper chamber of the gas accumulator together with the expansion chamber of the at least one gas tank.

If the load is to be transferred from a floating vessel to a fixed installation or to another floating vessel, heave movements may, at the end of the lift when there is little lifting height, cause inacceptable hard contact between the load and its deployment area. In such cases there may be advantageous to have the opportunity of having an operator triggered "panic lift". This may be obtained by having two gas tanks with accumulated gas under high pressure in the heave compensating device, of which one function as an emergency gas aggregate which maintains the gas at high pressure during all phases of the lift until the operator sends a panic lift signal. In this case the heave compensating device according to the invention needs to additionally comprise operator controlled communication means able to transfer a trigger signal to the data processing unit, which then causes gas from the emergency aggregate enters the first upper chamber and pushes the slide-able piston of the length extension device upwards toward the first end of the length extension device.

At lifting operations where the load is to be deployed on the sea bed, it may advantageously be included operator controlled communication means for manual triggering of the gas discharge at the end of the splashing phase. In this case the operator sends out a gas discharge signal to the data processing unit which initiates the discharge of gas from the expansion camber(s) by evacuating the gas through the third gas outlet. This signal may advantageously be a radio transmitted signal which is registered by the radio signal receiver 107, but may also be other acoustic, electric or electromagnetic signals transferred by wire, wire-less, or by optical fibre. This operation may also be triggered automatically by use of i.e. a sensor for external pressure. Or it may be performed manually by use of ROV-guided actuators.

As given in the above description of the heave compensating device according to the first aspect of the invention, it is a flexible heave compensating device which may be used for a range of various lifting operations offshore and onshore. The flexibility is obtained by the control unit 110 of the device which in real time keeps track on the position of the slide-able piston of at least one length extension device and real time measurements of the pressure and temperature of the gas phases of the device and which from this values determines how much gas there should be present at any time in the first upper chamber(s) and in the expansion chamber(s), and which then engages the activations means of one or more of the first, second, third, and fourth valve such that the determined amounts of gas are obtained in the respective chambers.

LIST OVER FIGURES

DESCRIPTION OF AN EXAMPLE EMBODIMENT OF THE INVENTION

Figure 1:
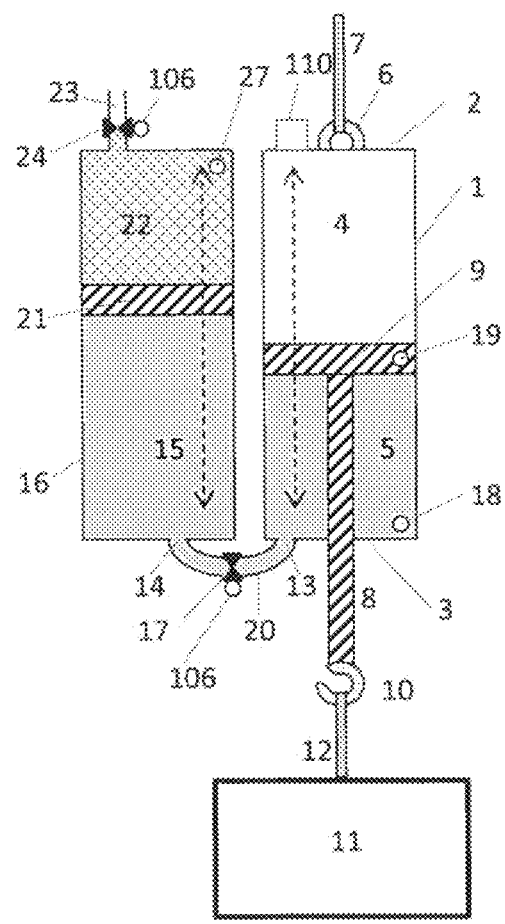
FIG. 1 is a schematic drawing seen from the side of an example embodiment of a heave compensator according to the invention.

The present invention will be described in greater detail by way of example embodiments. The example embodiments are based on the heave compensator described in FIGS. 2 and 3, and shows examples of how the control unit 110 of the heave compensator obtains the different functionalities in practice. However, these should not be interpreted in a restricting sense; the present invention also comprises additional possible configurations (number of length extension devices, gas accumulators, and/or gas tanks) and other possible ways of adjusting the gas pressure in the system to obtain the intended effect.

Example Embodiment 1, Quick Lift

This functionality is advantageous during lift of loads from a floating cargo vessel by a crane on another vessel, ashore etc., where wave induced motions of the cargo vessel involves a risk of re-contact between the load and vessel at the initial phase of the lift. The Quick lift is obtained by allowing piston 9 to be lowered towards the second end 3 of the length extension device and then allowing gas under a high pressure from the gas tank to flow into the gas accumulator to push piston 9 upward towards the first end 2 of the length extension device, and in this manner contributing to lift the load faster than the lifting crane may obtain alone. In this case, it is advantageous to balance two considerations, the need for avoiding re-contact by obtaining a sufficiently rapid safe lifting height of the load and the need for avoiding too heavy tensile strains on the load and/or the lifting device during the lift. It is thus advantageous if the heave compensator may execute the Quick lift without compromising too much of its ability to compensate for heave movements. This is obtained in practice by preventing the piston 9 to but against/come into contact with the lower end 3 of the length extension device such that heave movements may be compensated by a smooth and springy movement of piston 9.

In practice, this may be achieved by pre-storing sufficient amount of gas in the upper chamber 22 of the gas accumulator 16 such that when the sensible weight of the load begins to pull piston 9 towards the lower end 3 and thus decreasing the volume of chamber 22, that a sufficient strong pressures arises in the chamber 22 to counteract the pressure in the liquid phase when the full sensible weight of the load is pulling on piston 9, when the piston 9 is pulled to a pre-determined distance above the lower end 3. The distance above the lower end 3 of which the piston 9 may be pulled down to, depends on the heave compensator being employed, the weight of the load, and/or the tensile stress tolerance of the lifting device etc. The pre-determined distance above the lower end 3 may i.e. be in the range from 0.1 to 0.3 times the length of the length extension device.

It may also be advantageous to prevent the piston 9 is not pushed all the way up to such that it buts against the first end 2 to maintain the heave compensating ability during the Quick lift phase. This may be obtained by adapting the amount of pre-stored gas inside the expansion tank 29 such that when the gas is permitted to flow into the upper chamber 22 of the gas accumulator 16, it forms a gas pressure in chamber 22 which is able to push piston 9 up to a predetermined distance below the first end 2 of the length extension device 1. The pre-determined distance below end 2 may i.e. be in the range from 0.1 to 0.3 times the length of the length extension device.

The amount of pre-stored gas in the upper chamber 22 and in the expansion tank 29 become thus a function of the sensible weight of the load towards piston 9, such that the weight of the load should be known within an accuracy of i.e. ±10% in order to determine how much gas which needs to be pre-stored in the gas accumulator and in the gas tank. Further, since the gas from the gas tank is to flow into the gas accumulator to push piston 9 towards the upper end 2, the pressure in the pre-stored gas in the expansion tank 29 needs to be higher than the pressure of the pre-stored gas in the upper chamber 22. The amount of pre-stored gas in the expansion tank of the gas tank and in the upper chamber of the gas accumulator depends on the mass of the load, the Response Amplitude Operator (RAO) of the vessel, and the characteristics of the crane.

The initiating of the Quick lift, i.e. when the gas is to be permitted to flow into the gas accumulator, may advantageously "play along with the nature" by having an operator trigging the Quick lifting sequence when the carrying vessel is at a wave crest to ensure the maximum time window for lifting the load before the cargo vessel begins to move towards the load again at the next wave.

Figure 2:
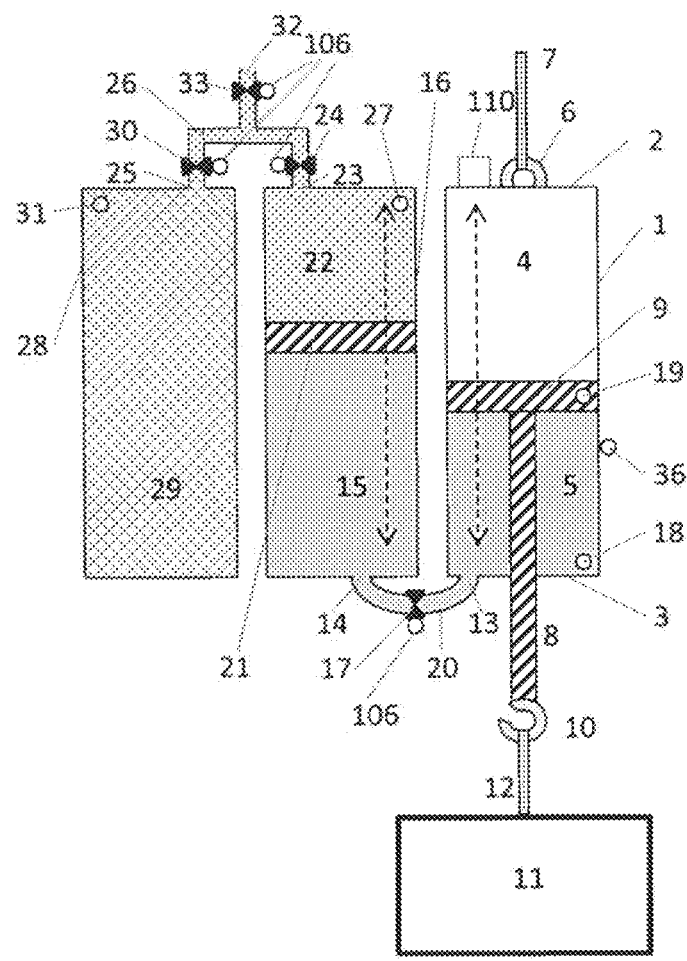
FIG. 2 is a schematic drawing seen from the side of a second example embodiment of a heave compensator according to the invention.
Figure 3:
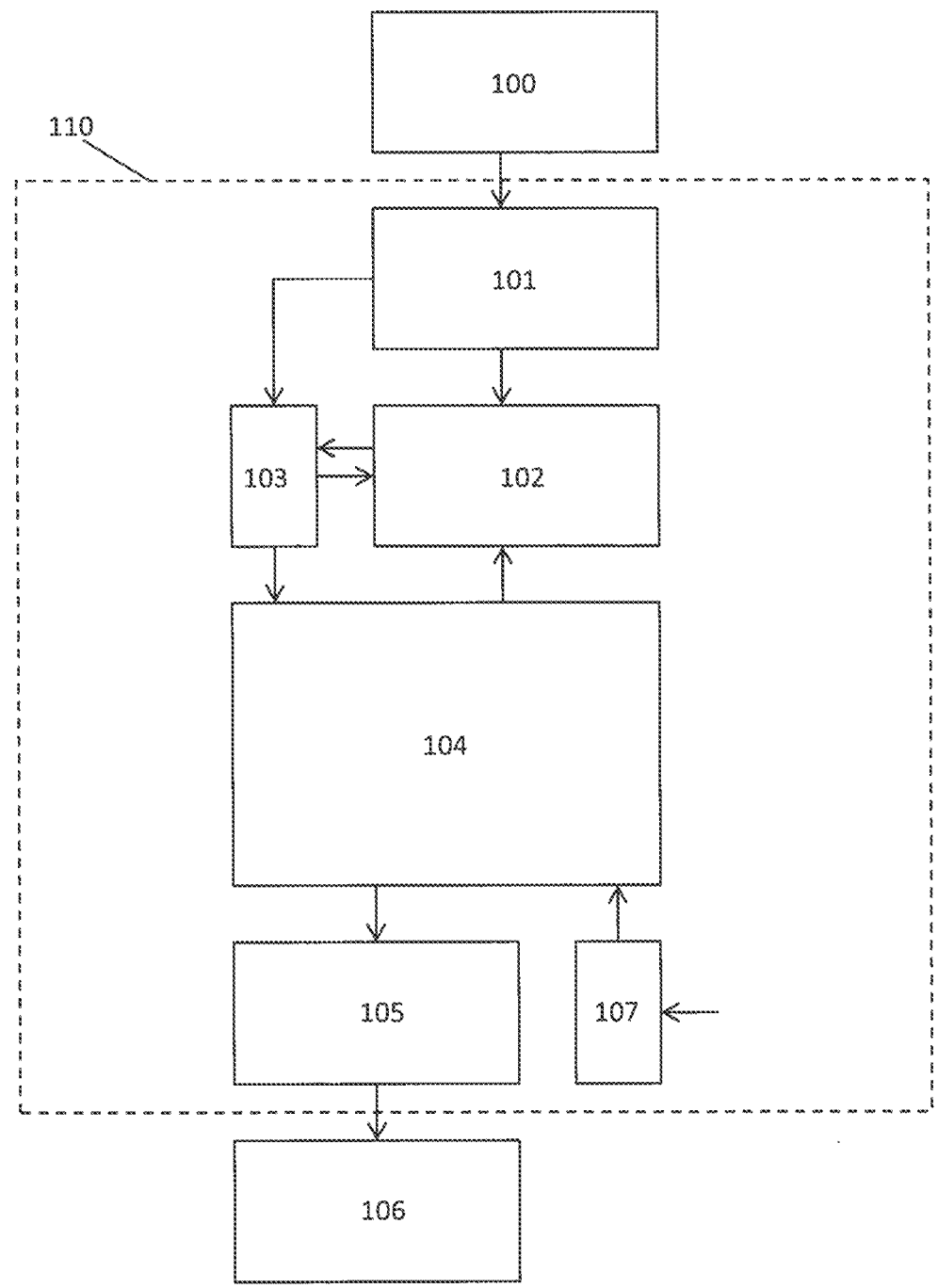
FIG. 3 is a box diagram showing an example embodiment of the components of the control unit 110, and how they are connected together.

If a Quick lift is to be executed, the desired amounts of gas are accumulated in the gas accumulator 16 and in the gas tank 29 of the heave compensator, and it is attached in its upper end 2 to the lifting device 7 and in its lower end (lower end 10 of the piston rod 8) to the load 11 as shown in FIG. 2. All valves on the gas outlets of the heave compensator are closed, and valve 17 of the liquid transferring device is open.

The computer program module "Quick lift" is engaged by an external guidance signal transmitted from the operator via the radio transmitter/receiver of the control unit 110, and contains data instructions which, when executed in the data processing unit of the control unit 110, causes the following process steps to be executed in successive order:
1) Wait for a guidance signal from the operator.
2) Upon receiving of the guidance signal, open valves 24 and 30 to cause gas under high pressure flowing from the expansion tank 29 into the upper chamber 22.

In a second aspect, the data processing unit 104 additionally comprises a Quick lift computer program module, containing data instructions which when executed in the data processing unit, performs a method comprising the following steps in successive order:
a) awaiting signal for executing the Quick lift computer program module is received, and then
b) open valves 24 and 30.

Example Embodiment 2, Weight Compensation

This functionality is an automatic regulation of the equilibrium position of the piston of the length extension device intended to maintain a maximum stroke length regardless the sensible weight of the load when the load is freely suspended in air.

After the execution of a Quick lift which raises the piston to an upper position in the length extension device, this functionality needs, in most lifting operations, only to lower the equilibrium position of the piston to approximately the middle of the length extension device. This example embodiment will thus describe this case. However, this is not to be interpreted as a limitation. It may also comprise the possibility of lifting the piston if it becomes below the desired equilibrium position, by letting gas flow from the gas tank (if it has sufficient high pressurised gas resources) into the gas accumulator.

The computer program module "Weight compensation" is engaged by an external guidance signal transmitted from the operator via the radio transmitter/receiver of the control unit 110, and contains data instructions which, when executed in the data processing unit of the control unit 110 causes the following process steps to be executed in successive order:
1) Controlling that valve 17 is open and that valves 24, 30, and 33 are closed, and await a guidance signal from the operator.
2) Upon receiving the guidance signal, await a predetermined time and read the signal from sensors 19 and 27 and determine the pressure and temperature in the accumulator and the position of piston 9, and employ these data to calculate the amount (in mass) of gas present in the accumulator at the moment, $m_k^{acc}$, and the amount of gas required in the gas accumulator to obtain the desired equilibrium position of the piston, $m_{sp}^{acc}$.
3) Thereafter, open valves 24 and 32 to allow gas being discharged out of the gas accumulator.
4) Reading the pressure and temperature in the accumulator and the position of piston 9 continuously via sensors 19 and 27, and calculate continuously the amount of gas present in the gas accumulator, $m_k^{acc}$, and employ this value to calculate $\Delta m_{sp} = m_k^{acc} - m_{sp}^{acc}$.
5) When $|\Delta m_{sp}| < K$, close valves 24 and 32 and stop the execution of the program module.

The calculation of the amount gas present in the gas accumulator is performed by applying the gas equation of state for an ideal gas utilising the registered values of the gas pressure and temperature inside the gas accumulator and by calculating the volume of the upper chamber 22 in the gas accumulator by utilising the registered position of piston 9 to determine its position $S_k$:

$$m_k^{acc} = \frac{P_k^{acc}(V_{acc} - A_o S_k)}{T_k^{acc} R_{N2}} \quad (1)$$

Here $m_k^{acc}$ is the amount of gas inside the accumulator at time k, $p_k^{acc}$ is the pressure in the gas at time k, $T_k^{acc}$ is the temperature of the gas at time k. $R_{N2}$ is the gas constant, $V_{acc}$ is the complete volume of the gas accumulator, and $A_0 S_k$ is the volume of the liquid filled chamber 15 at time k. $A_0$ is the area of the piston 21 of the accumulator. When the control unit 110 calculates the amount of gas required in the gas accumulator at the desired equilibrium position, it employs eqn. (1) with the value $S_{sp}$ instead of $S_k$, where $S_{sp}$ is the desired volume of chamber 15. The stop criterion K is a predetermined constant, which may i.e. be 5% of desired amount of gas.

In a third aspect, the data processing unit 104 additionally comprises a Weight compensating computer program module, containing data instructions which when executed in the data processing unit, performs a method which in addition to the method steps of the second aspect, also comprising the following steps in successive order:

d) controlling that valve 17 is open and valves 24, 30, and 33 are closed, and register continuously the signal from the position sensor 19 and pressure and temperature sensor 27, e) awaiting an execution signal from the operator, and when receiving the execution signal, await a predetermined time, and then calculate the equilibrium position of piston 9 from the registered position data from position sensor 19 and employ this value together with the pressure and temperature values from the pressure and temperature sensor 27 in eqn. (1) to calculate the desired amount of gas in the gas accumulator, $m_{sp}^{acc}$, and thereafter calculate continuously the present amount of gas in the gas accumulator, $m_k^{acc}$, f) thereafter, open valves 24 and 33, and calculate $\Delta m_{sp} = m_k^{acc} - m_{sp}^{acc}$, and g) when $|\Delta m_{sp}| < K$, where K is a predetermined stop criterion, close valves 24 and 33.

Example Embodiment 3, Lowering Preparation

This functionality ensures a "pre-setting" of the pressure in the gas tank for enabling lowering the dampening characteristics at great water depths by increasing the available volume of the gas phase by allowing the gas to flow freely between the gas tank and gas accumulator. In order to enable free gas flow between the gas tank and gas accumulator, the gas pressure in the gas tank needs to be more or less the same as the gas pressure in the gas accumulator when valves 24 and 30 are opened, otherwise the pressure change in the gas accumulator may cause an unacceptable change of the equilibrium position of the piston of the length extension device. The actual size of the pressure difference that may be tolerated depends on the sensible weight of the load, the stroke length of the length extension device, the water depth when opening valves 24 and 30, and may be up to a few bars. In order to obtain this functionality, it is necessary to calculate/determine in advance which pressure that will be present in the gas accumulator when the valves 24 and 30 are being opened, and then to adjust the pressure of the gas tank to the same value before the heave compensator is lowered to great water depths and discharge of the gas becomes impossible due to the hydrostatic pressure of the water. This calculation may advantageously take into account the amount of gas that is to be transferred from the gas accumulator to the gas tank as a consequence of the steps of regulating the stroke length. The calculation of the desired gas pressure in the expansion tank 29 may be performed by estimating the sensible weight of the load at the intended water depth and then calculating which pressure needs to be obtained in the liquid in chamber 5 to counter the tensile force on piston 9.

This functionality may advantageously be executed shortly after the load has obtained contact and been lowered a short distance into the water masses, but it may also be executed when the load is freely suspended in air, or after it has been lowered a bit longer distance into the water masses. The functionality may i.e. by the control unit 110 reading the signals from a fourth pressure and temperature sensor which measures the pressure of the surroundings of the device initiate the Lowering preparation when the heave compensator has reached e predetermined water depth, such as i.e. 100 m.

In a fourth aspect, the data processing unit 104 additionally comprises a Lowering compensation computer program module, containing data instructions which when executed in the data processing unit, performs a method comprising the following steps in successive order:

d0) controlling that valve 17 is open and valves 24, 30, and 33 are closed, d1) continuously reading the signal from the third pressure and temperature sensor 31, d2) determining the desired pressure of the gas phase in the expansion chamber 29 according to a predetermined estimate of the sensible weight of the load at the intended water depth, and calculate the pressure of the liquid in chamber 5 needed to balance the tensile force on piston 9 due to the sensible weight of the load, d3) opening valves 30 and 33, and d4) when the signal from the third pressure and temperature sensor 31 shows that the pressure in the expansion tank 29 has reached the desired pressure, close valve 33.

Example Embodiment 4, Depth Compensation

This functionality has the intention of regulating the equilibrium position of the piston of the length extension device in accordance with increasing hydrostatic pressures around the heave compensator when it is lowered into the water masses. This functionality may typically be triggered for each 50th meter water depth, and may advantageously be fully automatic due to practicalities associated with transmitting readable guidance signals from the surface down into deep water masses. This automechanism may be obtained by continuously feeding the data processing unit of the control unit 110 with pressure and eventual temperature data from the fourth pressure and temperature sensor which registers the temperature and pressure of the surroundings of the heave compensator, and utilising these data to determine when to execute the compensation of the equilibrium position of the piston. The regulation of the equilibrium position is obtained in the same manner as in example embodiment 2, with the exception that the gas being discharged from the gas accumulator is transferred to the gas tank when the hydrostatic pressure of the surrounding water masses makes it difficult/impossible to ventilate the gas out through outlet 32. In practice, this will be the case when the hydrostatic pressure of the water masses has reached about 50% of the gas pressure in the gas accumulator.

In a fifth aspect, the data processing unit 104 additionally comprises a Depth compensation computer program module, containing data instructions which when executed in the data processing unit, performs a method comprising the following steps in successive order:

A) controlling that valve 17 is open and valves 24, 30, and 33 are closed, B) continuously registering the signal from the fourth pressure and temperature sensor and utilising the signal to estimate the water depth, C) continuously reading the signal from position sensor 19 and pressure and temperature sensor 27, and D1) when the water depth has increased with a predetermined interval and the pressure of the surrounding water is less than 50% of the gas pressure inside the gas accumulator, execute steps from i) up to and including iii):

i) await a predetermined time, and then calculate the equilibrium position of piston 9 from the registered position data from position sensor 19, and employ this value together with the pressure and temperature values from the pressure and temperature sensor 27 in eqn. (1) to calculate the desired amount of gas in the gas accumulator, $m_{sp}^{acc}$, and thereafter calculate continuously the present amount of gas in the gas accumulator, $m_k^{acc}$, ii) thereafter, open valves 24 and 33, and calculate continuously $\Delta m_{sp} = m_k^{acc} - m_{sp}^{acc}$, and iii) when $|\Delta m_{sp}| < K$, where K is a predetermined stop criterion, close valves 24 and 33 and return to step A), D2) when the water depth has increased with a predetermined interval and the pressure of the surrounding water is larger than 50% of the gas pressure inside the gas accumulator, execute steps from j) up to and including jjj):

j) await a predetermined time, and then calculate the equilibrium position of piston 9 from the registered position data from position sensor 19, and employ this value together with the pressure and temperature values from the pressure and temperature sensor 27 in eqn. (1) to calculate the desired amount of gas in the gas accumulator, $m_{sp}^{acc}$, and thereafter calculate continuously the present amount of gas in the gas accumulator, $m_k^{acc}$, jj) thereafter, open valves 24 and 30, and calculate continuously $\Delta m_{sp} = m_k^{acc} - m_{sp}^{acc}$, and jjj) when $|\Delta m_{sp}| < K$, where K is a predetermined stop criterion, close valves 24 and 30 and return to step A).

Example Embodiment 5, Reduction of Spring Resistance

This functionality will usually be employed when a load is to be lowered to great water depths, and is usually triggered by the fourth pressure and temperature sensor of the device sensing that the desired water depth is obtained.

In a sixth aspect, the data processing unit 104 additionally comprises a Reduction of spring resistance computer program module, containing data instructions which when executed in the data processing unit, performs a method comprising the following steps:

A1) continuously registering the signal from the fourth pressure and temperature sensor and utilising the signal to estimate the water depth, and A2) when the water depth has reached a predetermined depth, open valves 24 and 30.

Example Embodiment 6, Lock and Release

This functionality may be useful when a load is turned over the side of the cargo vessel and when there is a small distance between the load and vessel that induces a risk of contact. In such cases it may be an advantage to lock the piston of the length extension device to reduce the risk of a heave movement lowering the load downwards against the side of the vessel.

This functionality may advantageously be combined with the Weight compensation functionality, and would normally be operator controlled by the operator sending a radio signal which is received by the radio receiver of the control unit 110, which locks the piston to prevent it from moving inside the length extension device. Release is obtained by the operator sending guidance signal which unlocks the piston. This may easily be obtained by closing and opening, respectively, valve 17 to prevent or allow liquid to flow in or out of chamber 5 of the length extension device.

In a seventh aspect, the data processing unit 104 additionally comprises a Reduction of spring resistance computer program module, which when executed in the data processing unit, performs a method characterised in that in addition to the steps of third aspect, additionally comprises the following step:

h) upon receiving a locking signal from the operator, close valve 17, and i) upon receiving a release signal from the operator, open valve 17.

Example Embodiment 7, Landing Compensation

This functionality is in one sense the opposite of the Quick lift functionality in that the pre-stored gas pressure in the gas tank is lower than the pressure in the accumulator, as opposed to higher as in the Quick lift, such that when the Landing compensation is to be executed, it will cause a sudden decrease in the lifting force such the load is standing steady against the ground. This is a useful functionality for cases where a load is to be deployed on a solid ground, such as a quay etc. and there is a risk for heave movements causing the load to be re-lifted off the ground after making first contact and thereafter banging down onto the ground.

In an eight aspect, the data processing unit 104 additionally comprises a Reduction of spring resistance computer program module, containing data instructions which when executed in the data processing unit, performs a method characterised in that in addition to the steps of third aspect, additionally comprises the following steps in successive order:

h) upon receiving a signal from an operator to initiate the Landing compensation, determine the desired pressure, $p_{sp}^{exp}$, of the gas phase in the expansion chamber 29 by reading the actual pressure, $p_k^{acc}$, in the gas accumulator registered by the pressure and temperature sensor 27, and set $p_{sp}^{exp} = f \cdot p_k^{acc}$, where $f \in \langle 0, 1 \rangle$, i) continuously reading the signal from the third pressure and temperature sensor 31, j) controlling that valve 24 is closed and thereafter open valves 30 and 33, and close valve 33 when the desired pressure, $p_{sp}^{exp}$, of the gas phase is obtained, and k) upon receiving a signal from the operator to execute the Landing compensation, open valve 24.

The determination of the desired pressure, $p_{sp}^{exp}$, in the gas chamber may be obtained by setting it to a factor F, which is between 0 and 1 times the pressure, $p_k^{acc}$ in chamber 22 of the gas accumulator at the initial phase of the function, preferably a factor between 0.5 and 0.95 times $p_k^{acc}$, between 0.6 and 0.9 times $p_k^{acc}$, or between 0.7 and 0.8 times $p_k^{acc}$.

Alternatively, in cases where a faster Landing compensation is desired, it may be based on use of valve 17 on the liquid transferring device instead of the gas valves 24, 30. In this case, the heave compensator is being pre-stored with sufficient amount of gas before initiating the lifting operation in the expansion chamber 29 to be able to push the piston 9 towards the first end of the length extension device in the same and analogous manner as the pre-storing of gas for the Quick lift functionality described above. By execution of the rapid landing compensation, the heave compensator is firstly prepared by allowing the gas to flow into the gas accumulator to push piston 9 towards the first end 2 of the length extension device and then locking it in this position by closing valve 17. Thereafter, valve 30 is closed and valves 24 and 33 opened to discharge gas from the gas accumulator until it contains sufficient amount of gas to be maintain a stable equilibrium position when the piston is lowered towards the second end 3 of the length extension device in the same and analogous manner as the Quick lift functionality. When the desired amount of gas in the upper chamber 22 is obtained, valves 24 and 33 are closed. Preparation to rapid landing compensation may advantageously be controlled by the operator sending a radio signal which is received by the radio receiver of the control unit 10 and triggers this function.

When the heave compensator has executed the preparation for the rapid landing compensation, the piston 9 will be locked in a relatively close distance from the first end of the length extension device, and the amount of gas in the upper chamber 22 is reduced to a level which is able to form a stable equilibrium position when the piston is lowered to a relatively short distance above the second end 3 of the length extension device. Then the actual rapid landing compensation may be obtained by only opening valve 17 to allow liquid to flow out of the length extension device and thus almost immediately reduce the tension forces on the load, the heave compensating device and the lifting device to a level ensuring that heave movements are unable to re-lifting the load from the ground it is to be deployed, and in the next moment banging down again on the ground and be damaged.

In a ninth aspect, the data processing unit 104 additionally comprises a rapid landing compensation computer program module, containing data instructions which when executed in the data processing unit, causes the following process steps to be executed in successive order:

awaiting receiving signal to preparation of rapid landing compensation from the operator, upon receiving a signal from an operator to execute preparation of rapid landing compensation, open valves 24 and 30 such that gas under high pressure flows from the expansion chamber 29 of the gas tank and into the upper chamber 22, and piston 9 is pushed towards the first end 2, after a predetermined time period, close valves 17 and 30, regulate thereafter the pressure in the gas accumulator to the desired by continuously registering the signal from the position sensor 19 and pressure and temperature sensor 27, and use the registered position data from sensor 19 to calculate the equilibrium position of piston 9, and utilise this value together with the pressure and temperature values from pressure and temperature sensor 27 in eqn. (1) to calculate the desired amount of gas, $m_{sp}^{acc}$, and thereafter continuously calculating the present amount of gas inside the gas accumulator, $m_k^{acc}$, opening thereafter valve 33 and calculate continuously $\Delta m_{sp} = m_k^{acc} - m_{sp}^{acc}$, and when $|\Delta m_{sp}| < K$, where K is a predetermined stop criterion, close valve 33, awaiting receiving signal to executing the rapid landing compensation from the operator, upon receiving the signal from the operator to execute the rapid landing compensation, open valve 24.

The sufficient amount gas in the expansion tank of the gas tank depends on the mass of the load, the Response Amplitude Operator (RAO) of the vessel, and the characteristics of the crane. The term "sufficient amount of gas" is in this context to be understood as the gas tank need to have sufficient amount of gas under high pressure to be able to at least be able to push the piston of the length extension device up to the first end of the length extension device when the pressure between the expansion tank 29 and the upper chamber 22 is equalised by allowing the gas to flow freely between the expansion chamber 29 and the upper chamber 22. Sufficient amount of gas needs to be determined for each lifting operation, but is a task within the ordinary skills of a person skilled in the art.

In all seven example embodiments, all regulations of liquid and/or gas flows in the heave compensator are described as opening or closing one or more of the first 17, second 24, third 30, and fourth 33 valve. It may however, also be applied a bypass conduit with a reduced through-flow capacity across one or more of these valves, and which may be opened or closed by a pressure compensating valve (not shown in the Figure). In such cases, the fluid flow (i.e. gas in the first 23, second 25, and/or third 32 gas outlet, and liquid in the first 13 liquid outlet) may be regulated by only opening/closing the respective pressure compensating valve, only opening the respective valve, or by a combined opening/closing of both the respective valves and pressure compensating valves. The pressure compensating valves have their own activation means which are activated by guidance signals sent by the signal transmitting unit of the control unit 110.

The invention claimed is:

1. A device for compensating for heave movements between a lifting device and a load lifted by the lifting device, the device comprising:
   an elongated length extension device comprising:
      a closed upper end;
      a lower end having an opening for a piston rod and a liquid outlet;
      an inner space divided by a slide-able first piston into an upper vacuum chamber and a first lower liquid filled chamber;
      a piston rod of length at least equal to the length of the length extension device, wherein a first end of the piston rod is attached to the first piston, and wherein the piston rod stretches through the first liquid filled chamber and further out through the opening in the lower end of the length extension device;
      means arranged at a second end of the piston rod for releasable attachment of the load; and
      means arranged at the upper end of the length extension device for releasable attachment of the lifting device;
   an elongated cylindrical gas accumulator comprising:
      an upper end having a first adjustable gas outlet, the first adjustable gas outlet having a first valve;
      a lower end having a liquid outlet; and
      an inner space divided by a slide-able second piston into an upper chamber and a second lower liquid filled chamber,
   an adjustable liquid transferring device fluidly connected to the liquid outlet of the lower end of the length extension device and the liquid outlet of the lower end of the cylindrical gas accumulator, the adjustable liquid transferring device having a second valve;
   an activator for selective opening or closing of one or both of the first valve and the second valve;
   a first and second pressure and temperature sensor for measuring a temperature and/or pressure of the liquid in at least one of the first lower liquid filled chamber and the second lower liquid filled chamber and the gas in the upper chamber of the cylindrical gas accumulator, respectively;
   a position sensor for measuring the position of the first piston; and
   a control unit comprising:
      a signal receiver unit and data storage memory for registering the measured temperatures and/or pressures of the liquid in one of or both of the first lower liquid filled chamber and the second lower liquid filled chamber, the gas in the upper gas filled chamber of the cylindrical gas accumulator, and the position of the first piston;
a signal treatment unit for calculating a real equilibrium position of the first piston from the registered temperatures and/or pressures and the registered positions of the first piston;
a data processing unit for calculating an amount of gas that needs to be ventilated out of the first adjustable gas outlet in order to obtain an intended equilibrium position of the first piston; and
a signal transmission unit engaging the activator of the first valve and/or the second valve such that the intended amount of gas exits through the first adjustable gas outlet and such that the first piston obtains the intended equilibrium position.

2. The device according to claim 1, further comprising:
a gas tank comprising:
  an upper end having a second adjustable gas outlet, the second adjustable gas outlet having a third valve;
  a closed lower end; and
  an expansion chamber;
a third pressure and temperature sensor for measuring the temperature and/or pressure of the gas in the expansion chamber of the gas tank;
a gas transferring device fluidly connected to the first adjustable gas outlet and the second adjustable gas outlet, the gas transferring device having a third adjustable gas outlet that opens to an environment surrounding the device, wherein the third adjustable gas outlet has a fourth valve; and
the activator may selectively open or close one or both of the third valve and the fourth valve,
wherein the signal receiver unit receives signals from the first, second, and third pressure and temperature sensor and the position sensor,
wherein the data processing unit contains computer software with instructions, wherein the computer software calculates the amount of gas present in the upper gas filled chamber and/or the expansion chamber by use of a gas equation of state and the registered temperatures and/or pressures,
wherein the signal transmission unit transmits guidance signals to the activator of one or more of the first, second, third, or fourth valve, and
wherein the data processing unit of the control unit contains one or more computer software modules each having a set of instructions that calculate, according to a wanted compensation functionality, a wanted amount of gas in the upper chamber of the cylindrical gas accumulator and/or the expansion chamber of the gas tank, and which activates the signal transmission unit such that the wanted amount of gas in the upper chamber of the cylindrical gas accumulator and/or the expansion chamber of the gas tank is obtained.

3. The device according to claim 2, wherein:
the length extension device is an elongated cylinder having an elongated inner space, wherein:
  the means for attachment of the length extension device to the lifting device comprises a hook located on the outside of the first end of the length extension device;
  the piston rod is arranged in parallel with the centre axis of the length extension device; and
  the opening in the second end of the length extension device is adapted to form a fluid tight closure around the piston rod;
the gas accumulator is an elongated cylinder having the inner space that is elongated and divided by the slideable piston of the gas accumulator into the upper chamber that is a first gas filled chamber and the second lower liquid filled chamber; and
the first, second, and third pressure and temperature sensors are a combined pressure and temperature sensor, or a separate pressure sensor and separate temperature sensor.

4. The device according to claim 2, wherein at least one of the liquid outlet of the lower end of the length extension device, the first adjustable gas outlet, the second adjustable gas outlet, or the third adjustable gas outlet has a by-pass conduit across the first, second, third, or fourth valve of the conduit equipped with a pressure compensating valve that are engaged individually by the activator via the signal transmission unit of the control unit.

5. The device according to claim 2, the device further comprising:
a fifth valve with activator located downstream from the fourth valve on the third adjustable gas outlet.

6. The device according to claim 2, wherein the signal treatment unit further comprises:
a filter that reduces or removes signal noise in the signals from one or more of the first, second, third, and fourth pressure and temperature sensor; and
a filter that filters out cyclic movements in the signal from the position sensor and estimates the equilibrium position of the first piston.

7. The device according to claim 2, wherein the control unit further comprises:
a signal transmitter/receiver that enables transmission of acoustic, electric, or electromagnetic guidance signals to and from the data processing unit of the control unit of the device; and
an external guidance unit, an operator, or a remotely operated vehicle (ROV).

8. The device according to claim 7, wherein the signal transmitter/receiver is a radio transmitter/receiver.

9. The device according to claim 2, wherein:
the expansion chamber of the gas tank is pre-stored with sufficient amount of gas under high pressure to at least be able to push the first piston of the length extension device up to the first end of the length extension device when the pressure in the expansion chamber of the gas tank and the upper chamber of the cylindrical gas accumulator are equalized by allowing the gas to flow freely between the expansion chamber of the gas tank and the upper chamber of the cylindrical gas accumulator; and
the data processing unit additionally comprises:
  a quick lift computer program module containing data instructions, wherein when the data instructions of the quick lift computer program are executed in the data processing unit, the data processing unit performs a method comprising:
    receiving a signal for executing the quick lift computer program module; and
    opening the first valve and the third valve.

10. The device according to claim 9, wherein the data processing unit further comprises:
a weight compensating computer program module containing data instructions, wherein when the data instructions of the weight compensating computer module are executed in the data processing unit, the data processing unit performs the method further comprising:

controlling that the first, the second, and the third valves are closed and that the second valve is open;

continuously registering the signal from the position sensor and the second pressure and temperature sensor;

awaiting an execution signal for the weight compensating computer program, and when the execution signal is received, awaiting a predetermined time, and then calculating the equilibrium position of the first piston from the registered position data from the position sensor, and employing this value together with the pressure and temperature values from the second pressure and temperature sensor in the following equation:

$$m_i^{acc} = \frac{P_i^{acc}(V_{acc} - A_o S_i)}{T_i^{acc} R_{N2}}$$

to calculate the desired amount of gas in the cylindrical gas accumulator ($m_{sp}^{acc}$) and thereafter continuously calculating the present amount of gas in the cylindrical gas accumulator ($m_k^{acc}$);

opening the first valve and the fourth valve;
calculating $\Delta m_{sp} = m_k^{acc} - m_{sp}^{acc}$; and
when $|\Delta m_{sp}| < K$, where K is a predetermined stop criterion, closing the first valve and the fourth valve.

11. The device according to claim 10, wherein the data processing unit further comprises:

a landing compensation computer program module containing data instructions, wherein when the data instructions of the landing compensation computer program module are executed in the data processing unit, the data processing unit performs a method comprising:

upon receiving a signal from an operator to initiate the landing compensation computer program module, determining the desired pressure ($p_{sp}^{acc}$) of the gas phase in the expansion chamber of the gas tank by reading the actual pressure ($p_k^{acc}$) in the cylindrical gas accumulator registered by second pressure and temperature sensor, and setting $p_{sp}^{acc} = f \cdot p_k^{acc}$, where $f \in <0, 1>$;

continuously reading the signal from the position sensor;

controlling that the first valve is closed, and thereafter opening the third and the fourth valves;

closing the fourth valve when the desired pressure ($p_{sp}^{acc}$), of the gas phase is obtained; and upon receiving a signal from the operator to execute the landing compensation computer program module, opening the first valve.

12. The device according to claim 11, wherein $f \in <0.5, 0.95>$, $f \in <0.6, 0.9>$ or $f \in <0.7, 0.8>$.

13. The device according to claim 2, wherein the data processing unit further comprises:

a lowering compensation computer program module containing data instructions, wherein when the data instructions of the lowering compensation computer program module are executed in the data processing unit, the data processing unit performs a method comprising:

controlling that the second valve is open and that the first, third, and fourth valves are closed;

continuously reading the signal from the position sensor;

determining the desired pressure of the gas phase in the expansion chamber of the gas tank according to a predetermined estimate of the sensible weight of the load at the intended water depth;

calculating the pressure of the liquid in the first lower liquid filled chamber needed to balance the tensile force on the first piston due to the sensible weight of the load, opening the third and fourth valves; and
when the signal from the third pressure and temperature sensor shows that the pressure in the expansion tank of the gas tank has reached the desired pressure, closing the fourth valve.

14. The device according to claim 2, wherein the data processing unit further comprises:

a depth compensation computer program module containing data instructions, wherein when the data instructions of the depth compensation computer program are executed in the data processing unit, the data processing unit performs a method comprising:

controlling that the first, third, and fourth valves are closed and that the second valve is open;

continuously registering the signal from the fourth pressure and temperature sensor and utilizing the signal to estimate the water depth;

continuously reading the signal from the position sensor and the second pressure and temperature; and when the water depth has increased with a predetermined interval and the pressure of the surrounding water is less than 50% of the gas pressure inside the cylindrical gas accumulator, execute:

awaiting a predetermined time, and then calculating the equilibrium position of the first piston from the registered position data from the position sensor and employing this value together with the pressure and temperature values from the second pressure and temperature sensor in the equation:

$$m_i^{acc} = \frac{P_i^{acc}(V_{acc} - A_o S_i)}{T_i^{acc} R_{N2}}$$

to calculate the desired amount of gas in the cylindrical gas accumulator ($m_{sp}^{acc}$) and thereafter continuously calculate the amount of gas being present in the cylindrical gas accumulator ($m_k^{acc}$);

opening the first valve and the fourth valve and continuously calculating $\Delta m_{sp} = m_k^{acc} - m_{sp}^{acc}$; and
when $|\Delta m_{sp}| < K$, where K is a predetermined stop criterion, closing the first valve and the fourth valve; or when the water depth has increased with a predetermined interval and the pressure of the surrounding water is larger than 50% of the gas pressure inside the cylindrical gas accumulator, execute:

awaiting a predetermined time, and then calculating the equilibrium position of the first piston from the registered position data from the position sensor, and employing this value together with the pressure and temperature values from the second pressure and temperature sensor in the equation:

$$m_i^{acc} = \frac{P_i^{acc}(V_{acc} - A_o S_i)}{T_i^{acc} R_{N2}}$$

to calculate the desired amount of gas in the cylindrical gas accumulator ($m_{sp}^{acc}$), and thereafter continuously calculating the present amount of gas in the cylindrical gas accumulator ($m_k^{acc}$);

opening the first valve and the third valve and continuously calculating $\Delta m_{sp} = m_k^{acc} - m_{sp}^{acc}$; and when $|\Delta m_{sp}| < K$, where K is a predetermined stop criterion, closing the first valve and the third valve.

15. The device according to claim 2, wherein the data processing unit further comprises:

a reduction of spring resistance computer program module containing data instructions, wherein when the data instructions of the reduction of spring resistance computer program module are executed in the data processing unit, the data processing unit performs a method comprising:

continuously registering the signal from the third pressure and temperature sensor and utilizing the signal to estimate the water depth; and when the water depth has reached a predetermined depth, opening the first valve and the third valve.

16. The device according to claim 2, wherein the data processing unit further comprises:

a lock and release computer program module, wherein when the lock and release computer program module is executed in the data processing unit, the data processing unit performs a method comprising:

upon receiving a locking signal from an operator, closing the second valve; and upon receiving a release signal from the operator, opening the second valve.

17. The device according to claim 2, wherein the data processing unit further comprises:

a rapid landing compensation computer program module containing data instructions, wherein when the data instructions of the rapid landing compensation computer program module are executed in the data processing unit, the data processing unit executes:

awaiting receiving signal to preparation of rapid landing compensation from an operator;

upon receiving the signal to execute preparation of the rapid landing compensation, opening the first and third valves such that gas under high pressure flows from the expansion chamber of the gas tank and into the upper chamber of the cylindrical gas accumulator and the first piston is pushed towards the upper end of the length extension device;

after a predetermined time period, closing the second and third valves;

regulating thereafter the pressure in the cylindrical gas accumulator to the desired by continuously registering the signal from the position sensor and the second pressure and temperature sensor and using the registered position data from the position sensor to calculate the equilibrium position of the first piston, and utilizing this value together with the pressure and temperature values from the second pressure and temperature in an equation:

$$m_i^{acc} = \frac{P_i^{acc}(V_{acc} - A_o S_i)}{T_i^{acc} R_{N2}}$$

to calculate the desired amount of gas ($m_{sp}^{acc}$) and thereafter continuously calculating the present amount of gas inside the cylindrical gas accumulator ($m_k^{acc}$);

opening thereafter the fourth valve and continuously calculating $\Delta m_{sp} = m_k^{acc} - m_{sp}^{acc}$;

when $|\Delta m_{sp}| < K$, where K is a predetermined stop criterion, close the first and fourth valves;

awaiting receiving signal to execute the rapid landing compensation from the operator, upon receiving the signal from the operator to execute the rapid landing compensation, opening the second valve.

18. The device according to claim 1, the device further comprising:

at least two gas tanks fluidly connected to the gas filled upper chamber of the cylindrical gas accumulator by a gas manifold connecting a gas outlet of each of the at least two gas tanks to the first adjustable gas outlet.

19. The device according to claim 1, the device further comprising:

at least two length extension devices, wherein the means for mechanical connection between the first slide-able piston of each of the at least two length extension devices and the suspended load are mechanically connected together to form a single unit equipped with the means for releasable attachment of the load.

20. The device according to claim 1, the device further comprising:

a fourth pressure and temperature sensor that measures the pressure and/or temperature of an environment surrounding the device.

* * * * *